US012752717B2

(12) United States Patent
Jung et al.

(10) Patent No.: US 12,752,717 B2
(45) Date of Patent: Oct. 6, 2026

(54) CLIP FOR A ROOF MOLDING

(71) Applicants: HYUNDAI MOTOR COMPANY, Seoul (KR); KIA CORPORATION, Seoul (KR)

(72) Inventors: Hwi-Sung Jung, Suwon-si (KR); Shin-Young Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 450 days.

(21) Appl. No.: 18/405,675

(22) Filed: Jan. 5, 2024

(65) Prior Publication Data

US 2025/0100466 A1 Mar. 27, 2025

(30) Foreign Application Priority Data

Sep. 27, 2023 (KR) ........................ 10-2023-0130674

(51) Int. Cl.
*B60R 13/04* (2006.01)
*B60R 11/00* (2006.01)

(52) U.S. Cl.
CPC ....... *B60R 13/04* (2013.01); *B60R 2011/0059* (2013.01)

(58) Field of Classification Search
CPC ......... B60R 13/02; B60R 13/04; B60R 13/06; B60R 2011/0059; B62D 25/06; B60J 10/35; B60J 10/86
See application file for complete search history.

(56) References Cited

U.S. PATENT DOCUMENTS

| | | | | |
|---|---|---|---|---|
| 7,045,189 B2 * | 5/2006 | Hui | B60R 13/04 | 296/213 |
| 7,621,574 B2 * | 11/2009 | Mourou | B60R 13/04 | 52/716.5 |
| 7,695,039 B2 * | 4/2010 | Sakamoto | B60R 13/04 | 296/1.08 |
| 8,020,354 B2 * | 9/2011 | Scroggie | B60R 13/04 | 52/716.2 |
| 8,205,923 B2 * | 6/2012 | Mourou | B60R 13/0206 | 52/716.5 |
| 8,657,370 B1 * | 2/2014 | Pierce | B60R 13/06 | 296/213 |
| 9,174,591 B2 * | 11/2015 | Bach | B60R 13/04 | |

(Continued)

FOREIGN PATENT DOCUMENTS

KR 102017048 B1 9/2019

*Primary Examiner* — Daniel J Wiley
(74) *Attorney, Agent, or Firm* — Lempia Summerfield Katz LLC

(57) ABSTRACT

A clip for a roof molding is coupled to a lower portion of a roof molding configured to cover junction surfaces of a roof panel and a side outer panel of a vehicle. The clip includes first and second bodies formed in a width direction of the roof molding and configured to face each other, a first connection part configured to connect one end of the first body and one end of the second body, and a second connection part configured to connect the other end of the first body and the other end of the second body. The clip further includes a tolerance absorbing support part having one end coupled to one end of a side of the first body adjacent to the first connection part, and the other end coupled to one end of a side of the second body adjacent to the first connection part.

16 Claims, 10 Drawing Sheets

(56) References Cited

U.S. PATENT DOCUMENTS

| | | | | | |
|---|---|---|---|---|---|
| 2012/0292950 | A1* | 11/2012 | Stahlhut | B60R 9/04 | 296/210 |
| 2014/0265455 | A1* | 9/2014 | Fulton | B60R 13/04 | 296/210 |

* cited by examiner

CLIP FOR A ROOF MOLDING

CROSS-REFERENCE TO RELATED APPLICATION

This application claims priority to Korean Patent Application No. 10-2023-0130674, filed on Sep. 27, 2023, the entire contents of which are incorporated herein by reference.

BACKGROUND

Field

The present disclosure relates to a clip for fastening a roof molding for a vehicle.

Description of Related Art

As illustrated in FIGS. 1 to 3, at left and right edges of a roof for a vehicle, a roof panel 10 and a side outer panel 20 are joined to each other, such that junction surfaces are defined between the roof panel 10 and the side outer panel 20. In order to prevent the junction surface from being exposed to the outside, a space portion is defined between the roof panel 10 and the side outer panel 20, and a roof molding 40 is assembled to and covers the space portion.

The roof molding 40 has ribs protruding toward two opposite sides and assembled to be in close contact with the roof panel 10 and the side outer panel 20, respectively. A clip 50 coupled to a lower portion of the roof molding 40 is fitted with and coupled to a flange 11 formed uprightly from an end of the roof panel 10, thereby reinforcing a fixing force of the roof molding 40.

Further, a rotation support structure 51 protruding downward to support a rotation of the clip 50 interferes with a sealer 30 excessively applied between the side outer panel 20 and the roof panel 10. In other words, the potential separation of the roof molding 40 is likely caused by a lack of the support structure or the occurrence of interference, depending on the amount of sealer.

In addition, because of a defective bending shape of the roof molding 40, the molding clip 50 and the flange 11 of the roof panel 10 may be incompletely fastened.

In addition, as illustrated in FIG. 3, a meandering shape of a trim line of the roof panel 10 in the related art may cause many defective sealer operations. In case that a panel structure with a straightened sealer, in which a flange is biased laterally, is applied to solve the above-mentioned problem, a rotational momentum is generated in a separation direction of the clip 50, and the roof molding 40 may be separated, as illustrated in FIG. 1.

For this reason, the separation of the roof molding, which occurs while the vehicle travels, may also hinder the traveling of a subsequent vehicle or cause a concern for an accident.

The statements in this Background section merely provide background information related to the present disclosure and may not constitute prior art.

SUMMARY

The present disclosure provides a clip for a roof molding, which is capable of ensuring the design durability of a part having a problem with watertightness of a roof part and preventing separation of a roof molding caused by interference between a coating sealer and the clip.

In one embodiment, a clip for a roof molding is coupled to a lower portion of a roof molding configured to cover junction surfaces of a roof panel and a side outer panel of a vehicle. The clip includes: first and second bodies formed in a width direction of the roof molding and configured to face each other; a first connection part configured to connect one end of the first body and one end of the second body; and a second connection part configured to connect the other end of the first body and the other end of the second body. The clip further includes a tolerance absorbing support part having one end coupled to one end of a side of the first body adjacent to the first connection part, and the other end coupled to one end of a side of the second body adjacent to the first connection part. In particular, the tolerance absorbing support part is formed below a lower-end surface of one end of the first body and a lower-end surface of one end of the second body.

In this case, the tolerance absorbing support part may have a curved shape.

Further, the tolerance absorbing support part may have a curved shape so that a height of a central portion thereof is smaller than a height of each of two opposite ends thereof.

In addition, the first connection part may have a flange catching protrusion protruding from the first connection part toward the second connection part and inclined downward, and the flange catching protrusion may be fastened to a flange of the roof panel.

In one embodiment, a stepped portion is formed in an upper or inclined surface of the inclined flange catching protrusion.

In one embodiment, the second connection part may have a molding fastening protrusion protruding laterally from the second connection part and fastened to a fastening portion of the roof molding.

In one embodiment, the clip may further include: a third connection part disposed between the first connection part and the second connection part and configured to connect the first body and the second body.

In one embodiment, the third connection part may have a flange support portion protruding toward the first connection part and configured to support a lateral surface of a flange of the roof panel.

As another embodiment, a clip for a roof molding is coupled to a lower portion of a roof molding configured to cover junction surfaces of a roof panel and a side outer panel of a vehicle. The clip includes: first and second bodies formed in a width direction of the roof molding and configured to face each other; and a first connection part configured to connect one end of the first body and one end of the second body. The clip further includes: a second connection part configured to connect the other end of the first body and the other end of the second body; and support parts respectively formed on an outer surface of one end of a side of the first body adjacent to the first connection part and an outer surface of one end of a side of the second body adjacent to the first connection part.

In one embodiment, the support part may be a bridge-shaped support part extending in the width direction of the roof molding and including an end configured to be bent and extend upward. The bridge-shaped support part may support the side outer panel.

In one embodiment, the support part may be a leg-shaped support part extending in a length direction of the roof molding and including an end that is bent and extends upward.

In another embodiment, the support part may be a stand-shaped support part including: an upper end portion extending in the width direction of the roof molding, and lower end portions extending from two opposite ends of the upper end portion and curved downward.

In one embodiment, the support parts may be hook-shaped support parts respectively extending downward from one end of the first body and one end of the second body and then bent inward based on the width direction of the roof molding.

In one embodiment, the first connection part may include a flange catching protrusion protruding from the first connection part toward the second connection part and inclined downward. The flange catching protrusion may be fastened to a flange of the roof panel, and the second connection part may have a molding fastening protrusion protruding laterally from the second connection part and fastened to a fastening portion of the roof molding.

In one embodiment, a stepped portion may be formed in an upper or inclined surface of the inclined flange catching protrusion.

In one embodiment, the clip may further include: a third connection part disposed between the first connection part and the second connection part and configured to connect the first body and the second body. The third connection part has a flange support portion protruding toward the first connection part and configured to support a lateral surface of a flange of the roof panel.

According to the clip for a roof molding of the present disclosure, it is possible to basically reduce a likelihood of separation of the roof molding by minimizing interference between the sealer and the clip, basically solve a problem with watertightness of the roof part, prevent a rotation of the roof molding, and ensure quality.

DETAILED DESCRIPTION

Hereinafter, embodiments of the present disclosure are described in detail with reference to the accompanying drawings, and since these embodiments, as examples, may be implemented in various different forms by those having ordinary skill in the art to which the present disclosure pertains, they are not limited to the embodiments described herein.

In order to sufficiently understand the present disclosure, advantages in operation of the present disclosure, and the object to be achieved by carrying out the present disclosure, reference needs to be made to the accompanying drawings for illustrating an exemplary embodiment of the present disclosure and contents disclosed in the accompanying drawings.

Further, in the description of the present disclosure, the repetitive descriptions of publicly-known related technologies are reduced or omitted when it is determined that the descriptions may unnecessarily obscure the subject matter of the present disclosure.

Figure 1:
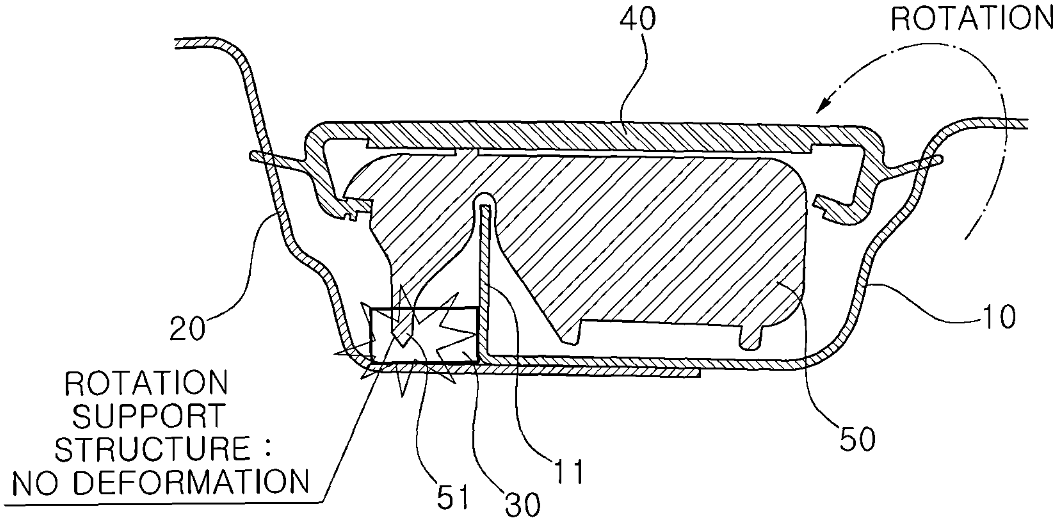
FIG. 1 (PRIOR ART)
FIG. 1 is a view illustrating a coupling relationship between a roof molding and a clip in the related art.
Figure 2:
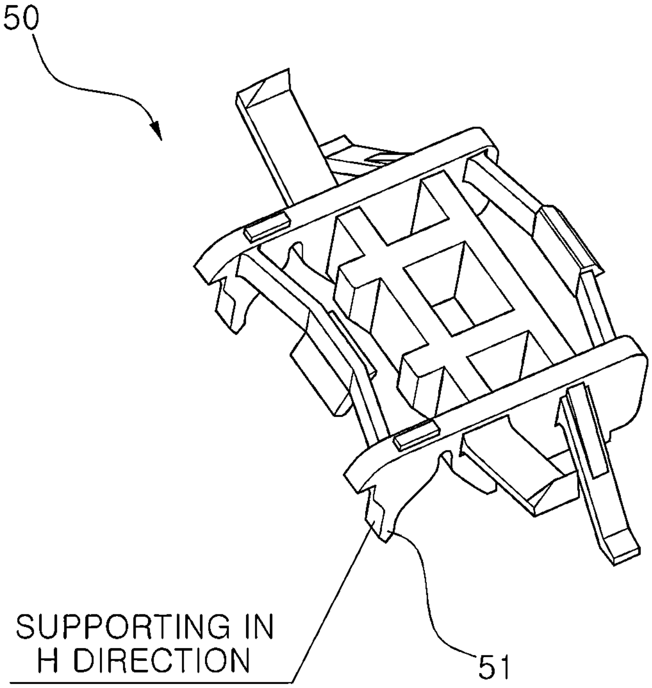
FIG. 2 (PRIOR ART)
FIG. 2 is a view illustrating the clip for a roof molding in the related art.
Figure 3:
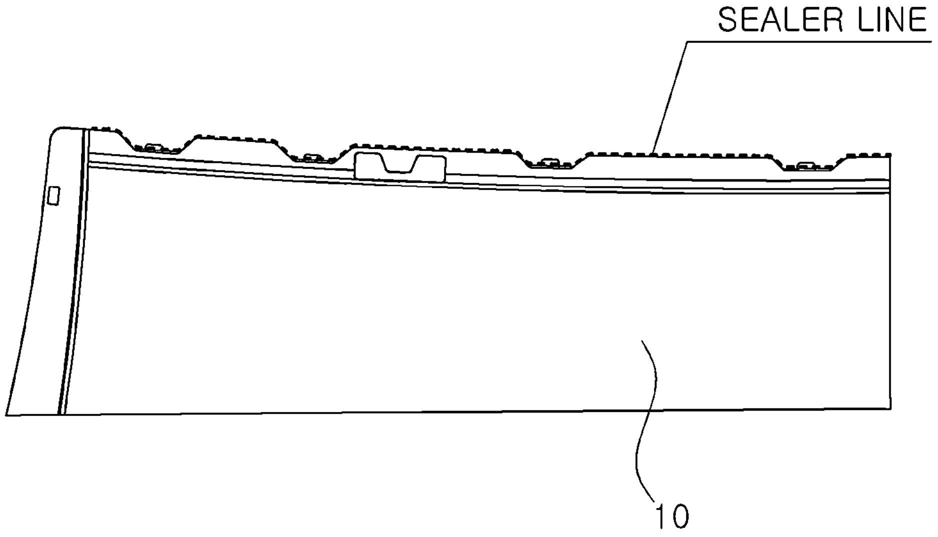
FIG. 3 (PRIOR ART)
FIG. 3 is a view illustrating a trim line of a roof panel in the related art.
Figure 4:
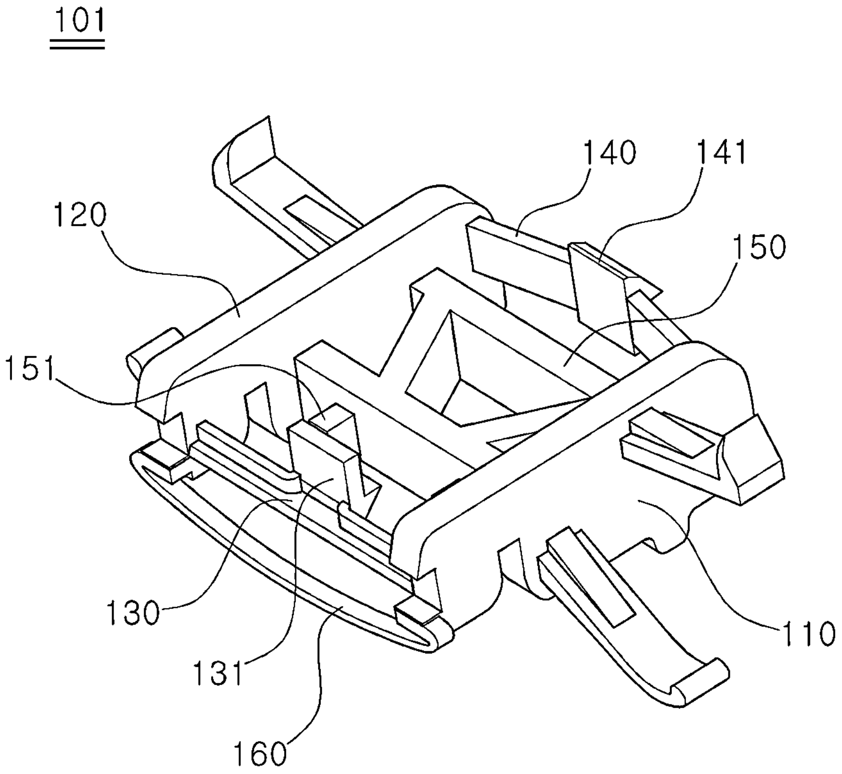
FIG. 4 is a view illustrating a clip for a roof molding according to a first embodiment of the present disclosure.
Figure 5:
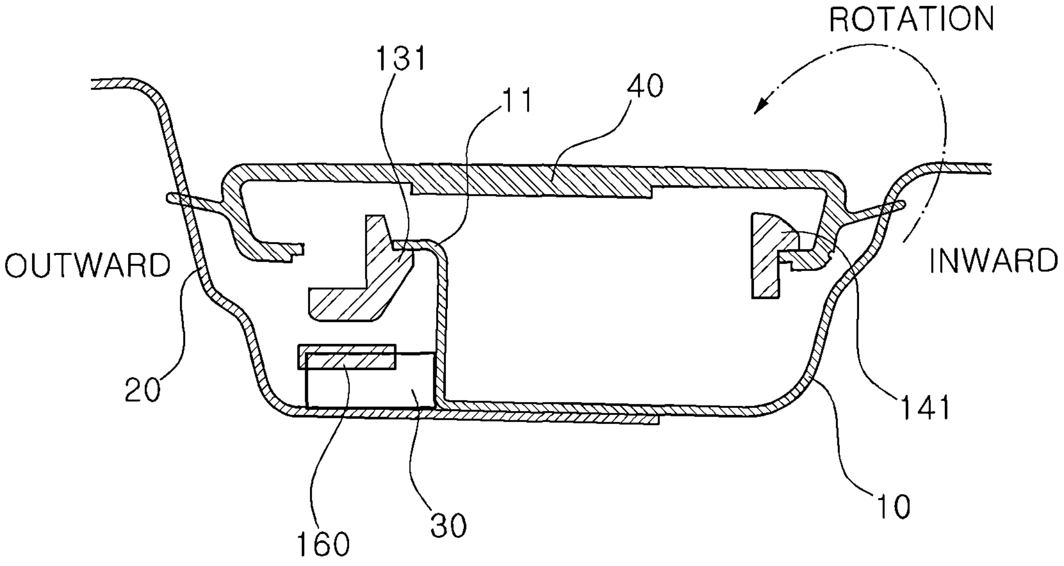
FIG. 5 is a view illustrating a state in which the clip for a roof molding according to the first embodiment of the present disclosure is coupled to a roof molding and a panel.

FIG. 4 is a view illustrating a clip for a roof molding according to a first embodiment of the present disclosure, and FIG. 5 is a view illustrating a state in which the clip for a roof molding according to the first embodiment of the present disclosure is coupled to a roof molding and a panel.

Hereinafter, a clip for a roof molding according to a first embodiment of the present disclosure is described with reference to FIGS. 4 and 5.

As illustrated in FIG. 4, according to the first embodiment of the present disclosure, a clip 101 for a roof molding includes first and second bodies 110 and 120 disposed to face each other, a first connection part 130 configured to connect one end of the first body 110 and one end of the second body 120, a second connection part 140 configured to connect the other end of the first body 110 and the other end of the second body 120, and a third connection part 150 disposed between the first connection part 130 and the second connection part 140. The third connection part 150 enhances rigidity by connecting the first body 110 and the second body 120.

As illustrated in FIGS. 4-5, a length direction of each of the first and second bodies 110 and 120 is defined as a width direction of the roof molding 40, and a length direction of each of the first and second connection parts 130 and 140 is defined as a length direction of the roof molding 40.

The first connection part 130 has a flange catching protrusion 131 protruding from the first connection part 130 and inclined downward. The flange catching protrusion 131 is caught by the flange 11 of the roof panel 10 after the clip 50 is fastened, such that the first connection part 130 is not separated from the roof panel 10.

To this end, the flange 11 has a shape extending uprightly upward from an end of the roof panel 10 based on the width direction and then bent in a direction toward the flange catching protrusion 131.

The second connection part 140 also has a molding fastening protrusion 141 protruding laterally from the second connection part 140. The molding fastening protrusion 141 is fastened to a fastening portion bent downward from a skin portion (upper surface) of the roof molding 40.

Because the third connection part 150 serves to reinforce the rigidity between the first body 110 and the second body 120, the third connection part 150 may have a shape such as a lattice or truss shape for load dispersion, as illustrated in FIGS. 4, 6 and 8-10.

Further, the third connection part 150 has a flange support portion 151 protruding toward the first connection part 130, such that the flange support portion 151 may absorb a tolerance in the width direction of the flange 11 fastened to the flange catching protrusion 131.

The clip 101 for a roof molding of the present disclosure requires a structure that may prevent the fastened clip from being rotated by an external force. In the related art, a rotation support structure protruding downward from the clip is provided to prevent the fastened clip from being rotated by an external force. In contrast, the clip 101 for a roof molding of the present disclosure further includes a tolerance absorbing support part 160 having one end coupled to one end of the first body 110 and the other end coupled to one end of the second body 120. The tolerance absorbing support part 160 is formed below a lower-end surface of one end of the first body 110 and a lower-end surface of one end of the second body 120.

Therefore, the tolerance absorbing support part 160 is configured not only to prevent the rotation of the clip, but also to absorb a tolerance of a height of the sealer and a tolerance of a height of the flange 11.

The tolerance absorbing support part 160 may have a curved shape so that a height of a central portion thereof is smaller than a height of each of two opposite ends thereof.

The tolerance absorbing support part 160 may prevent the rotation of the roof molding 40 by using a repulsive force of the clip by means of overlap with the sealer 30 and absorb the tolerance of the height of the sealer 30 and the tolerance of the height of the flange 11.

Therefore, the tolerance absorbing support part 160 may be applied to a panel for absorbing manufacturing dispersion and straightening the sealer, thereby improving vehicle body watertightness and external appearance quality and basically coping with field claims by using the repulsive force of the sealer.

The present disclosure additionally provides a clip for a roof molding, which may exhibit an effect equal to or more effective than that of the above-mentioned first embodiment by variously modeling the tolerance absorbing support part.

Figure 6:
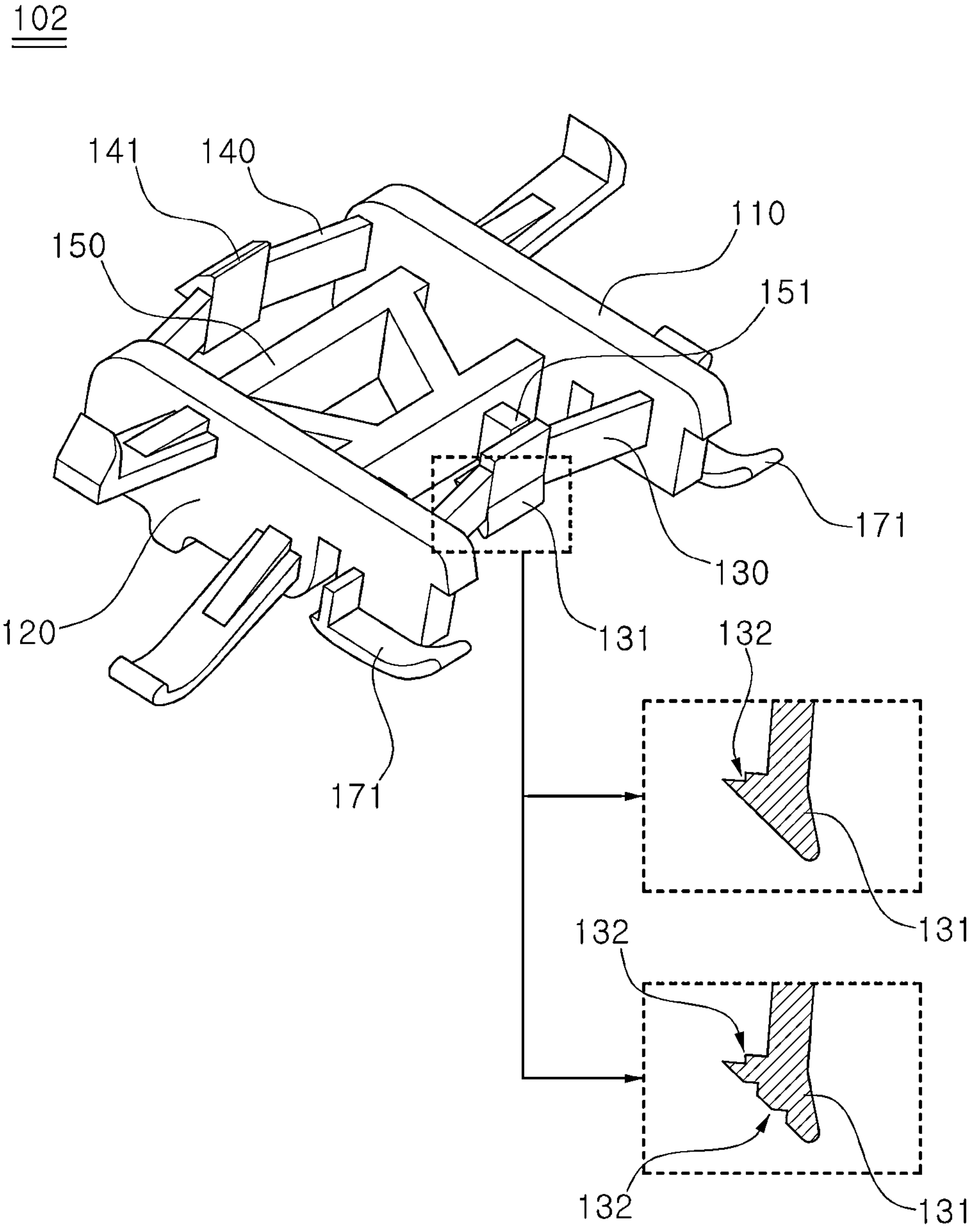
FIG. 6 is a view illustrating a clip for a roof molding according to a second embodiment of the present disclosure.
Figure 7:
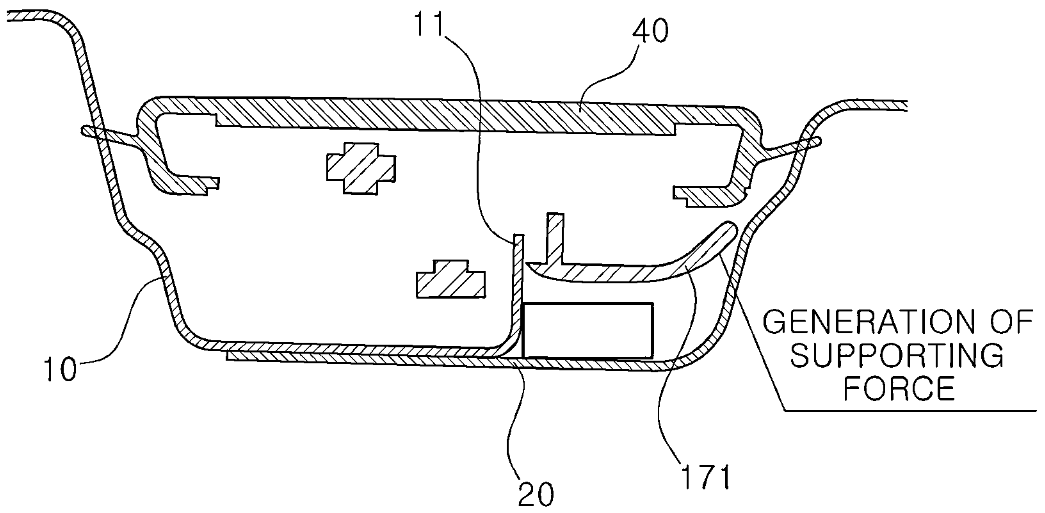
FIG. 7 is a view illustrating a state in which the clip for a roof molding according to the second embodiment of the present disclosure is coupled to the roof molding and the panel.

FIG. 6 is a view illustrating a clip for a roof molding according to a second embodiment of the present disclosure, and FIG. 7 is a view illustrating a state in which the clip for a roof molding according to the second embodiment of the present disclosure is coupled to the roof molding and the panel.

According to the second embodiment, a clip 102 for a roof molding includes a fastening reinforcement support part as the tolerance absorbing support part in the above-mentioned embodiment. The fastening reinforcement support part of the second embodiment includes bridge-shaped support parts 171.

The bridge-shaped support parts 171 of the clip 102 are provided as a pair of bridge-shaped support parts 171 and formed on an outer surface of one end of the first body 110 and an outer surface of one end of the second body 120.

The bridge-shaped support part 171 extends approximately horizontally in the width direction of the roof molding 40, and then an end of the bridge-shaped support part 171 is bent or inclined upward.

Therefore, as illustrated in FIG. 7, the end of the bridge-shaped support part 171 supports the side outer panel 20 and prevents the rotation of the roof molding 40.

Further, a stepped catching protrusion 132 may be further applied to the flange catching protrusion 131 of the first embodiment.

With reference to the enlarged view in FIG. 6, the stepped catching protrusion 132 protrudes from the first connection part 130 toward the third connection part 150, an upper surface of the catching protrusion inclined downward is stepped, and an inclined surface is stepped, such that the stepped catching protrusion 132 may absorb the tolerances in the height and width directions of the flange 11.

Figure 8:
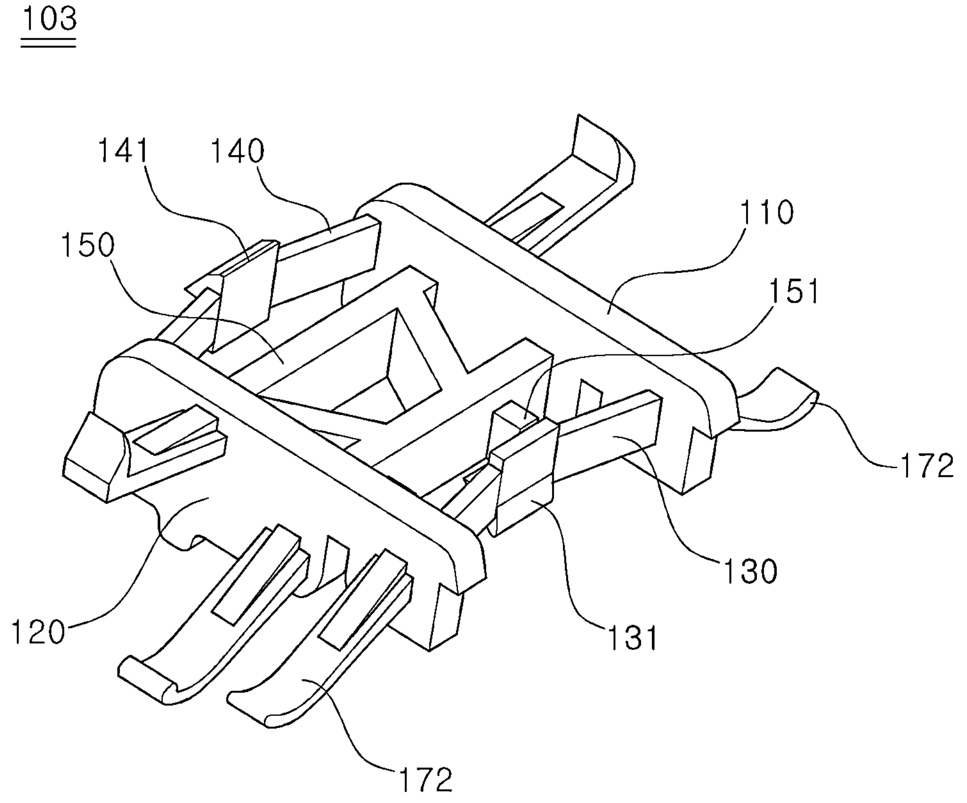
FIG. 8 is a view illustrating a clip for a roof molding according to a third embodiment of the present disclosure.

FIG. 8 is a view illustrating a clip for a roof molding according to a third embodiment of the present disclosure.

According to the third embodiment, a clip 103 for a roof molding includes leg-shaped support parts 172 different from the support parts of the above-mentioned embodiments.

The leg-shaped support parts 172 of the clip 103 may extend from the outer surface of one end of the first body 110 and the outer surface of one end of the second body 120 in the length direction of the roof molding 40. The leg-shaped support parts 172 may be provided as a plurality of leg-shaped support parts 172 respectively formed on the outer surface of one end of the first body 110 and the second body 120.

The leg-shaped support part 172 may extend in the length direction of the roof molding 40, and then an end of the leg-shaped support part 172 may be bent or inclined upward, such that the leg-shaped support part 172 may absorb a tolerance of the sealer 30.

Further, a catching protrusion may be selectively applied as the flange catching protrusion 131 or a stepped catching protrusion.

Figure 9:
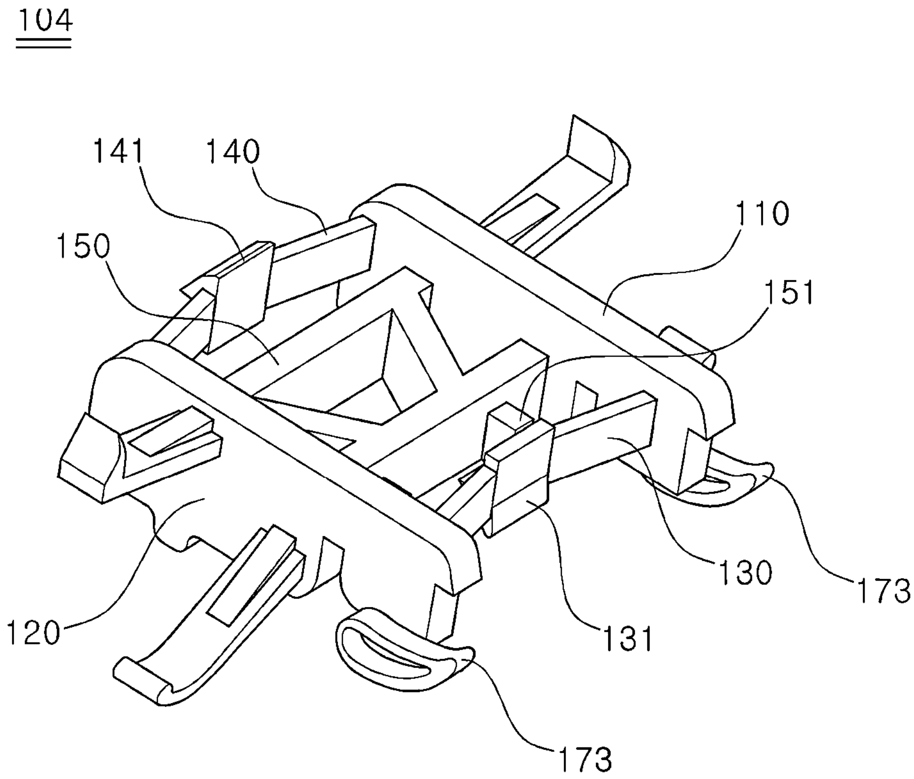
FIG. 9 is a view illustrating a clip for a roof molding according to a fourth embodiment of the present disclosure.

FIG. 9 is a view illustrating a clip for a roof molding according to a fourth embodiment of the present disclosure.

According to the fourth embodiment, a clip 104 for a roof molding includes stand-shaped support parts 173 different from the support parts of the above-mentioned embodiment.

The stand-shaped support parts 173 of the clip 104 are provided as a pair of stand-shaped support parts 173 and formed on the outer surface of one end of the first body 110 and the outer surface of the one end of the second body 120.

The stand-shaped support part 173 may include an upper end portion approximately horizontally extending in the width direction of the roof molding 40, and lower end portions extending from two opposite ends of the upper end portion and curved downward. Therefore, the stand-shaped support part 173 may absorb a tolerance of the sealer 30.

Further, a catching protrusion may be selectively applied as the flange catching protrusion 131 or a stepped catching protrusion.

Figure 10:
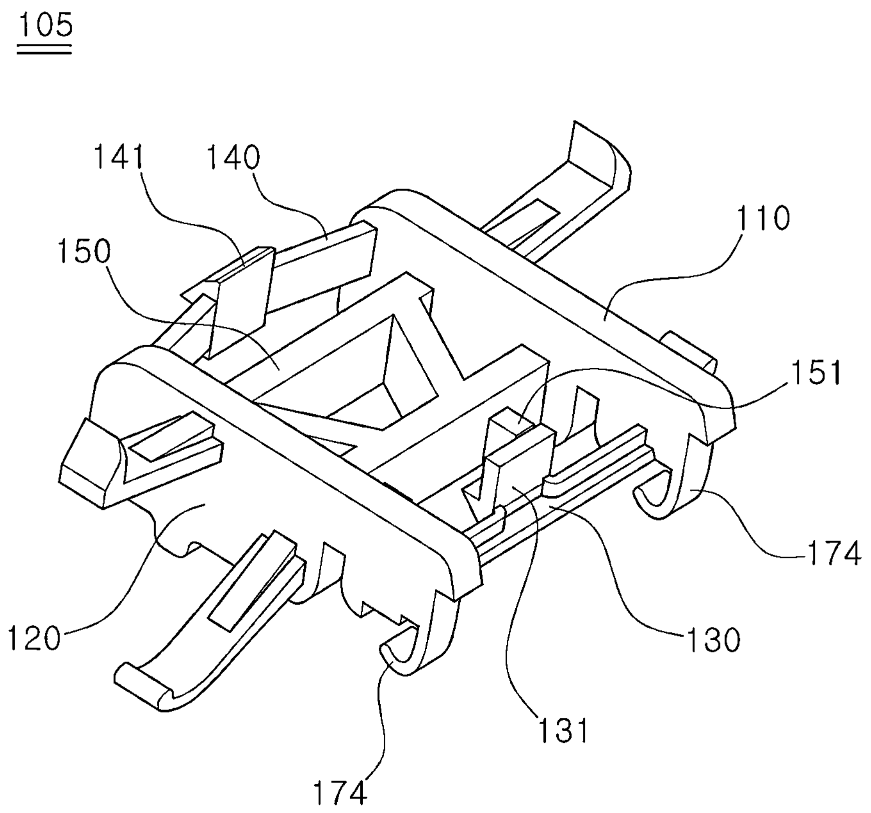
FIG. 10 is a view illustrating a clip for a roof molding according to a fifth embodiment of the present disclosure.

FIG. 10 is a view illustrating a clip for a roof molding according to a fifth embodiment of the present disclosure.

According to the fifth embodiment, a clip 105 for a roof molding includes hook-shaped support parts 174 different from the support parts of the above-mentioned embodiments.

The hook-shaped support parts 174 of the clip 105 are provided as a pair of hook-shaped support parts 174 and formed on the outer surface of one end of the first body 110 and the outer surface of one end of the second body 120.

The hook-shaped support parts 174 respectively extend downward from one end of the first body 110 and one end of the second body 120 and are then bent inward in the width direction of the roof molding 40, thereby forming hook shapes. Therefore, the hook-shaped support part 174 may absorb a tolerance of the sealer 30.

Further, a catching protrusion may be selectively applied as the flange catching protrusion 131 or a stepped catching protrusion.

According to the present disclosure described above, it is possible to support the rotation of the clip, reduce a coupling tolerance with the flange, and prevent the separation of the roof molding by enabling the assembling while absorbing the tolerance in accordance with the amount of sealer.

According to a result of measuring an insertion force of the clip by using a push-pull gauge after applying the sealer, by 3 to 5 mm, onto the junction surfaces of the roof panel 10 and the side outer panel 20 and then mounting the clip according to the embodiment of the present disclosure in order to verify the clip, it can be ascertained that the insertion force of the clip according to the embodiment of the present disclosure is lower than an insertion force of a clip in the related art.

This is because the clip according to the embodiment of the present disclosure may absorb the tolerance of the sealer and have a secure fixing force.

While the present disclosure has been described with reference to the exemplified drawings, it is obvious to those having ordinary skill in the art that the present disclosure is not limited to the aforementioned embodiments, and may be variously changed and modified without departing from the spirit and the scope of the present disclosure. Accordingly, the changed or modified examples belong to the claims of the present disclosure and the scope of the present disclosure should be interpreted on the basis of the appended claims.

What is claimed is:

1. A clip coupled to a lower portion of a roof molding configured to cover junction surfaces of a roof panel and a side outer panel of a vehicle, the clip comprising:

a first body and a second body formed in a width direction of the roof molding and configured to face each other;

a first connection part configured to connect a first end of the first body and a first end of the second body;

a second connection part configured to connect a second end of the first body and a second end of the second body; and a tolerance absorbing support part having a first end coupled to the first body adjacent to the first connection part, and a second end coupled to the second body adjacent to the first connection part, the tolerance absorbing support part being formed below a lower-end surface of the first end of the first body and a lower-end surface of the first end of the second body.

2. The clip of claim 1, wherein the tolerance absorbing support part has a curved shape.

3. The clip of claim 2, wherein the tolerance absorbing support part has a curved shape so that a height of a central portion thereof is smaller than a height of each of two opposite ends thereof.

4. The clip of claim 3, wherein the first connection part includes a flange catching protrusion protruding from the first connection part toward the second connection part and inclined downward, and the flange catching protrusion is fastened to a flange of the roof panel.

5. The clip of claim 4, wherein a stepped portion is formed in an upper or inclined surface of the inclined flange catching protrusion.

6. The clip of claim 3, wherein the second connection part includes a molding fastening protrusion protruding laterally from the second connection part and fastened to a fastening portion of the roof molding.

7. The clip of claim 3, further comprising:

a third connection part disposed between the first connection part and the second connection part and configured to connect the first body and the second body.

8. The clip of claim 7, wherein the third connection part includes a flange support portion protruding toward the first connection part and configured to support a lateral surface of a flange of the roof panel.

9. A clip for a roof molding, where the clip is coupled to a lower portion of a roof molding configured to cover junction surfaces of a roof panel and a side outer panel of a vehicle, the clip comprising:

a first body and a second body formed in a width direction of the roof molding and configured to face each other;

a first connection part configured to connect a first end of the first body and a first end of the second body;

a second connection part configured to connect a second end of the first body and a second end of the second body; and support parts respectively extending from an outer surface of the first body laterally away from the first connection part and extending from an outer surface of the second body laterally away from the first connection part.

10. The clip of claim 9, wherein the support parts each comprise a bridge-shaped support part extending in the width direction of the roof molding, and the bridge-shaped support part includes an end configured to be bent and extend upward, and wherein the bridge-shaped support part supports the side outer panel.

11. The clip of claim 9, wherein the support parts each comprise a leg-shaped support part extending in a length direction of the roof molding and including an end configured to be bent and extend upward.

12. The clip of claim 9, wherein the support parts each comprise a stand-shaped support part including:

an upper end portion extending in the width direction of the roof molding, and lower end portions extending from two opposite ends of the upper end portion and curved downward.

13. The clip of claim 9, wherein the support parts are hook-shaped support parts respectively extending downward from the first end of the first body and the first end of the second body and then bent inward based on the width direction of the roof molding.

14. The clip of claim 9, wherein the first connection part includes a flange catching protrusion protruding from the first connection part toward the second connection part and inclined downward, and the flange catching protrusion is fastened to a flange of the roof panel, and wherein the second connection part includes a molding fastening protrusion protruding laterally from the second connection part and fastened to a fastening portion of the roof molding.

15. The clip of claim 14, wherein a stepped portion is formed in an upper or inclined surface of the inclined flange catching protrusion.

16. The clip of claim 9, further comprising:

a third connection part disposed between the first connection part and the second connection part and configured to connect the first body and the second body, wherein the third connection part includes a flange support portion protruding toward the first connection part and configured to support a lateral surface of a flange of the roof panel.

* * * * *